United States Patent
Nakajima et al.

[11] Patent Number: 5,623,560
[45] Date of Patent: Apr. 22, 1997

[54] METHOD FOR ADJUSTING POSITIONS OF RADIATION IMAGES

[75] Inventors: Nobuyoshi Nakajima; Daigo Ezuka, both of Kanagawa-ken, Japan

[73] Assignee: Fuji Photo Film Co., Ltd., Kanagawa, Japan

[21] Appl. No.: 507,022

[22] Filed: Jul. 25, 1995

Related U.S. Application Data

[63] Continuation of Ser. No. 158,875, Nov. 29, 1993, abandoned.

[30] Foreign Application Priority Data

Nov. 27, 1992 [JP] Japan .................................... 4-318533
Nov. 27, 1992 [JP] Japan .................................... 4-318534
Jan. 19, 1993 [JP] Japan .................................... 5-006645

[51] Int. Cl.$^6$ ..................................................... G06K 9/32
[52] U.S. Cl. ......................................................... 382/295
[58] Field of Search ................................. 382/295, 296, 382/128, 130, 132, 144, 151, 263, 288; 364/413.13, 413.14, 413.15, 413.22, 413.23

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,356,398 | 10/1982 | Komaki et al. | 250/327.2 |
| 4,387,428 | 6/1983 | Ishida et al. | 364/414 |
| 4,636,953 | 1/1987 | Kageyama | 364/413.23 |
| 4,685,146 | 8/1987 | Fenster et al. | 382/288 |
| 4,710,875 | 12/1987 | Nakajima et al. | 364/414 |

(List continued on next page.)

FOREIGN PATENT DOCUMENTS 56-11395 2/1981 Japan ............................ G21K 4/00

OTHER PUBLICATIONS

"Automated Cloud Tracking Using Precisely Aligned Digital ATS Pictures" (Smith et al), ibid., vol. c–21, pp. 715–729, Jul. 1972.

"A Class of Algorithms for Fast Digital Image Registration", (Barnea et al), IEEE. Trans., vol. c–21, pp. 179–186, Feb. 1972.

Proceedings of Eusipco 92, Sixth European Signal Processing Conference, Brussels, Belgium, Aug. 24–27, 1992; Signal Processing VI Theories and Applications, vol. III; Elsevier, Amsterdam, Netherlands, pp. 1437–1440 XP356512, Qin–Sheng Chen et al: 'Three dimensional image registration based on parameter accumulation'.

Proceedings of Eusipco 92, Sixth European Signal Processing Conference, Brussels, Belgium, Aug. 24–27, 1992; Elsevier, Amsterdam, Netherlands, pp. 1441–1444 XP356513, Alessandra Semino et al: 'Image registration by a region–based approach and by correction of elastic deformations.'

*Primary Examiner*—Jose L. Couso
*Attorney, Agent, or Firm*—Sughrue, Mion, Zinn, Macpeak & Seas

[57] ABSTRACT

Reference regions are set in a radiation image, which serves as a reference among a plurality of radiation images, and template regions are set in the other radiation images. An orthogonal coordinate system is defined on each of the plurality of the radiation images. First template matching is carried out in order to match the template regions to the reference regions. Factors of affine transformation are calculated, and first affine transformation is carried out, with which at least the correction with a rotating operation and the correction with an enlargement or reduction factor are carried out on the radiation images containing the template regions. Second template matching is then carried out on the radiation images, which have been obtained from the first affine transformation. The factors of affine transformation are calculated, and second affine transformation is then carried out, with which the correction with the rotating operation, the correction with the enlargement or reduction factor, and the correction with a parallel translation are carried out on the radiation images containing the template regions.

13 Claims, 4 Drawing Sheets

U.S. PATENT DOCUMENTS

| | | | |
|---|---|---|---|
| 4,860,374 | 8/1989 | Murakami et al. | 382/151 |
| 4,870,694 | 9/1989 | Takeo | 382/128 |
| 4,955,062 | 9/1990 | Terui | 382/144 |
| 5,046,108 | 9/1991 | Inoue et al. | 382/6 |
| 5,058,176 | 10/1991 | Shimazaki et al. | 382/132 |
| 5,072,384 | 12/1991 | Doi et al. | 382/132 |
| 5,179,597 | 1/1993 | Takeo | 382/288 |
| 5,187,752 | 2/1993 | Takeo | 382/263 |
| 5,241,607 | 8/1993 | Launay et al. | 382/6 |
| 5,309,356 | 5/1994 | Nishide et al. | 364/413.22 |
| 5,481,623 | 1/1996 | Hara | 382/128 |

METHOD FOR ADJUSTING POSITIONS OF RADIATION IMAGES

This is a continuation of application No. 08/158,875 filed Nov. 29, 1993, now abandoned.

BACKGROUND OF THE INVENTION

1. Field of the Invention

This invention relates to a method for adjusting positions of a plurality of radiation images, which are to be subjected to superposition processing or subtraction processing, by eliminating shifts in positions among the radiation images. This invention particularly relates to a method for adjusting positions of radiation images, wherein image patterns of a marker for position adjustment need not be embedded in the radiation images.

2. Description of the Prior Art

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which carries image information of an object, such as a human body. In this manner, a radiation image of the object is stored on the stimulable phosphor sheet. The stimulable phosphor sheet, on which the radiation image has been stored, is then exposed to stimulating rays, which cause it to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed, and the processed image signal is then used during the reproduction of a visible image, which has good image quality and can serve as an effective tool in, particularly, the efficient and accurate diagnosis of an illness. The visible image finally obtained may be reproduced in the form of a hard copy or may be displayed on a display device, such as a cathode ray tube (CRT) display device.

Techniques for carrying out superposition processing on radiation images have heretofore been disclosed in, for example, U.S. Pat. No. 4,356,398. In general, radiation images are used for diagnoses of illnesses and for other purposes. When a radiation image is used for such purposes, it is required that even small differences in the radiation energy absorption characteristics among structures of an object can be detected accurately in the radiation image. The extent, to which such differences in the radiation energy absorption characteristics can be detected in a radiation image, is referred to as the contrast detection performance or simply as the detection performance. A radiation image having better detection performance has better image quality and can serve as a more effective tool in, particularly, the efficient and accurate diagnosis of an illness. Therefore, in order for the image quality to be improved, it is desirable that the detection performance of the radiation image be improved. The detection performance is adversely affected by various noises.

Superposition processing is carried out in order to reduce the aforesaid noises markedly so that even small differences in the radiation energy absorption characteristics among structures of an object can be found accurately in a visible radiation image, which is reproduced finally, i.e. the detection performance of the radiation image can be improved markedly. Specifically, a radiation image is stored on each of a plurality of stimulable phosphor sheets, which have been placed one upon another. Thereafter, an image read-out operation is carried out for each of the stimulable phosphor sheets. A plurality of image signals, which have been obtained from the image read-out operations, are added to one another. In this manner, various noises described above can be reduced.

By way of example, when superposition processing is to be carried out, two stimulable phosphor sheets have heretofore been housed in a cassette such that they may overlap one upon the other. Radiation images of an object are then recorded on the two stimulable phosphor sheets housed in the cassette. Thereafter, an image read-out operation is carried out on each of the two stimulable phosphor sheets, and two image signals are thereby obtained. The two image signals are then added to each other.

Also, techniques for carrying out subtraction processing on radiation images have heretofore been known. When subtraction processing is to be carried out, two radiation images recorded under different conditions are photoelectrically read out, and digital image signals which represent the radiation images are thereby obtained. The image signal components of the digital image signals, which represent corresponding picture elements in the radiation images, are then subtracted from each other, and a difference signal is thereby obtained which represents the image of a specific structure or part of the object represented by the radiation images. With the subtraction processing method, two digital image signals are subtracted from each other in order to obtain a difference signal, and the radiation image of a specific structure can be reproduced from the difference signal.

Basically, subtraction processing is carried out with either the so-called temporal (time difference) subtraction processing method or the so-called energy subtraction processing method. In the former method, in order to extract the image of a specific structure of an object from the image of the entire object, the image signal representing a radiation image obtained without injection of contrast media is subtracted from the image signal representing a radiation image in which the image of the specific structure of the object is enhanced by the injection of contrast media. In the latter method, an object is exposed to several kinds of radiation having different energy distributions. Alternatively, the energy distribution of the radiation carrying image information of an object, is changed after it has been irradiated onto one of at least two radiation image recording media, after which the radiation impinges upon the second radiation image recording medium. In this manner, at least two radiation images, in which different images of a specific structure of the object are embedded, are obtained. Thereafter, the image signals representing at least two radiation images are weighted appropriately, when necessary, and subjected to a subtraction process, and the image of the specific structure of the object is thereby extracted.

Subtraction processing is extremely effective, particularly for medical diagnosis, and electronics research has continued to develop improved subtraction processing methods.

However, the problems described below are encountered in the superposition processing and the subtraction processing of radiation images, wherein stimulable phosphor sheets are utilized.

Specifically, when each of the superposition processing method and the subtraction processing method utilizing the stimulable phosphor sheets is to be carried out, at least two stimulable phosphor sheets are inserted into an image recording apparatus one after the other or simultaneously, and radiation images to be subjected to the superposition processing or the subtraction processing are recorded on the stimulable phosphor sheets. Thereafter, each of the stimulable phosphor sheets is inserted into an image read-out apparatus and exposed to stimulating rays, which cause the stimulable phosphor sheet to emit light in proportion to the amount of energy stored thereon during its exposure to the radiation. The light emitted by each stimulable phosphor sheet is detected, and the radiation image stored on the stimulable phosphor sheet is thereby read out. In such cases, even if the operations for recording and reading out the radiation images are carried out very carefully, a shift and a rotation will occur between the images to be subjected to the superposition processing or the subtraction processing. As a result, in the superposition processing, even if various noises are averaged and reduced, the entire area of the superposition image, which is obtained from the superposition processing, particularly edges of a structure in the superposition image, will become unsharp. Therefore, a superposition image cannot be obtained which has good image quality and can serve as an effective tool in, particularly, the efficient and accurate diagnosis of an illness. Also, in the subtraction processing, as a result of the shift and the rotation occurring between the images to be subjected to the subtraction processing, an image pattern to be erased in a subtraction image, which is obtained from the subtraction processing, cannot be erased. Alternatively, an image pattern to be formed in the subtraction image will be erased, and an artifact will occur. Therefore, an accurate subtraction image cannot be obtained. In this manner, the shift and the rotation occurring between the images to be subjected to the superposition processing or the subtraction processing adversely affect the image quality of the image obtained from the superposition processing or the subtraction processing.

The radiation image is stored as a latent image on the stimulable phosphor sheet and cannot be viewed directly like an X-ray image recorded as a visible image on X-ray photographic film. Therefore, the positions of two or more radiation images stored on the stimulable phosphor sheets cannot be visually matched to each other. Accordingly, if the shift and the rotation occur between the radiation images stored on the stimulable phosphor sheets, the shift and the rotation cannot be eliminated easily.

Also, even if the shift and the rotation between two radiation images can be detected by some means, considerable time will be required for conventional operations to be carried out in order to correct the image signals detected from the radiation images, particularly in order to eliminate the rotation between the radiation images. This is a very real problem in practical use.

In U.S. Pat. No. 4,710,875, the applicant proposed a subtraction processing method for radiation images, wherein a marker having a shape such that it may provide a reference point or a reference line is utilized. With the proposed method, image patterns of the marker are recorded on two stimulable phosphor sheets such that the patterns of the marker may be located at positions fixed with respect to radiation images stored on the stimulable phosphor sheets. When the radiation images are read out from the stimulable phosphor sheets, the patterns of the marker are detected. The amounts of a shift and a rotation between the two radiation images are then calculated with reference to the patterns of the marker. Thereafter, either one of the radiation images to be subjected to subtraction processing is digitally rotated and/or translated in accordance with the calculated amount of the rotation and/or the calculated amount of the shift. The image signal components of the image signals, which represent corresponding picture elements in the radiation images, are then subtracted from each other. The position adjusting step, which is carried out in the subtraction processing method for radiation images utilizing the marker, can also be applied to the aforesaid superposition processing method. In such cases, after the positions of the radiation images are digitally matched to each other, the image signal components of the image signals, which represent corresponding picture elements in the radiation images, may be added to each other.

However, with the proposed method, each time a radiation image of an object is recorded on a stimulable phosphor sheet, the pattern of the marker must be recorded together with the object image on the stimulable phosphor sheet. Also, the problems occur in that the image information of the object cannot be obtained from the portion of the radiation image stored on the stimulable phosphor sheet, which portion overlaps upon the position of the pattern of the marker.

SUMMARY OF THE INVENTION

The primary object of the present invention is to provide a method for adjusting positions of radiation images, wherein an image pattern of a marker, or the like, need not be recorded for position adjustment together with an object image in each of radiation images.

Another object of the present invention is to provide a method for adjusting positions of radiation images, wherein positions of radiation images are quickly and accurately matched to each other.

The present invention provides a first method for adjusting positions of radiation images, wherein the positions of a plurality of radiation images are matched to one another such that the radiation images may be subjected to superposition processing or subtraction processing, the method comprising the steps of:

i) setting at least two regions of interest in each of the plurality of the radiation images, the positions of which are to be adjusted, such that the regions of interest may be approximately common to the plurality of the radiation images, the regions of interest in a radiation image, which serves as a reference among the plurality of the radiation images, being taken as reference regions, the regions of interest in the other radiation images being taken as template regions, ii) defining an orthogonal coordinate system on each of the plurality of the radiation images, iii) carrying out first template matching in order to match the template regions to corresponding reference regions, iv) calculating values of coordinates of corresponding points in the plurality of the radiation images, at least two corresponding points being taken in each of the plurality of the radiation images, v) calculating factors of affine transformation for transforming values of coordinates in the radiation images, which contain the template regions, into values of coordinates in the radiation image, which contains the reference regions, such that the corresponding points in the plurality of the radiation images may coincide with one another, the affine transformation being represented by the formula $$\begin{pmatrix} u \\ v \end{pmatrix} = \begin{pmatrix} a & b \\ c & d \end{pmatrix} \cdot \begin{pmatrix} x \\ y \end{pmatrix} + \begin{pmatrix} e \\ f \end{pmatrix}$$

wherein u and v represent the coordinates of the reference region, x and y represents the coordinates of the specific region, a, b, c, and d are the factors representing correction with a rotating operation and correction with an enlargement or reduction factor, and e and f are the factors representing correction with parallel translation, vi) carrying out first affine transformation, in which the calculated factors of affine transformation are used and with which at least the correction with the rotating operation and the correction with the enlargement or reduction factor are carried out on the plurality of the radiation images containing the template regions, vii) carrying out second template matching on the plurality of the radiation images, which have been obtained from the first affine transformation, viii) calculating the factors of affine transformation, which is represented by the formula, and ix) carrying out second affine transformation, in which the factors of affine transformation having been calculated after the second template matching are used and with which the correction with the rotating operation, the correction with the enlargement or reduction factor, and the correction with the parallel translation are carried out on the plurality of the radiation images containing the template regions.

In the first method for adjusting positions of radiation images in accordance with the present invention, such that the accuracy, with which the positions of the radiation images are adjusted, may be kept higher, the first affine transformation should preferably be repeated a plurality of times. As the number of the affine transformations is increased, the accuracy, with which the positions of the radiation images are adjusted, becomes higher. However, in such cases, a longer time is required for the position adjustment to be completed. Therefore, the number of affine transformations should preferably be set by considering the required time such that the accuracy, with which the position adjustment is carried out, can be kept at a desired level.

With the template matching, in cases where the template regions and the reference regions are set in the manner described above, the template regions are moved on the radiation image containing the reference regions, and the locations of the template regions, at which the template regions best match to the reference regions, are thereby found. The points representing the locations which have thus been found give the coordinates of the corresponding points.

The degree of matching in the template matching may be evaluated with a correlation method or sequential similarity detection algorithms (hereinafter referred to as SSDA).

With the correlation method, the product of image signal components, which represent corresponding picture elements in the corresponding regions on the radiation images, is calculated. The sum of the products, which have thus been calculated for the picture elements in the corresponding regions on the radiation images, is then normalized, and the value obtained from the normalization (hereinafter referred to as the normalized value) is taken as the grade of superposition. During the normalization, the product (the square) of the image signal component, which represents each picture element in each region, is calculated, and the sum of the products, which have thus been calculated for the picture elements in each region, is then calculated. Thereafter, the product of the sums, which have thus been calculated for the corresponding regions on the radiation images, is calculated. The square root of the product, which has thus been obtained, is taken as the denominator for the aforesaid sum of the products of image signal components, which represent corresponding picture elements in the corresponding regions on the radiation images. In cases where the corresponding regions are completely superposed one upon the other, the product of the image signal components, which represent corresponding picture elements in the corresponding regions on the radiation images, may not become equal to the square of each of these image signal components due to noise, or the like, and therefore the normalized value may not become equal to 1. However, in such cases, the normalized value will take the maximum value which is closest to 1. Therefore, the template regions may be moved in various ways on the radiation image containing the reference regions. When the template regions have been moved such that the aforesaid normalized value may become maximum, it may be considered that the superposition of the corresponding regions on the radiation images have been accomplished. However, the judgment as to whether the template regions have been or have not been moved such that the aforesaid normalized value may become maximum can be made only after all of the movements have been carried out. The correlation method is described in detail in, for example, "Automated Cloud Tracking Using Precisely Aligned Digital ATS Pictures" by Smith, et al., ibid., Vol. c-21, pages 715–729, July 1972.

With the SSDA, the difference between the image signal components, which represent corresponding picture elements in the corresponding regions on the radiation images, is calculated. The sum of the absolute values of the differences, which have thus been calculated for the picture elements in the corresponding regions on the radiation images, is taken as the grade of superposition. In cases where the corresponding regions are completely superposed one upon the other, even if the sum (the residual) does not become equal to 0 due to noise, or the like, the residual will become minimum. Therefore, the template regions may be moved in various ways on the radiation image containing the reference regions. When the template regions have been moved such that the residual may become minimum, it may be considered that the superposition of the corresponding regions on the radiation images have been accomplished. If the positions of the corresponding regions on the radiation images shift from each other, the residual will increase sharply during the addition of the absolute values of the differences between the image signal components, which represent corresponding picture elements in the corresponding regions on the radiation images. Therefore, with the SSDA, when the residual becomes larger than a certain threshold value during the addition, the addition is ceased, and next movement of the template regions is begun. With the SSDA, only the addition is carried out during the calculation. Also, in many cases, the calculation is ceased before it is carried out for all of the picture elements in the corresponding regions on the radiation images. Therefore, the calculation time can be kept short. The SSDA method is described in detail in, for example, "A Class of Algorithms for Fast Digital Image Registration" by Barnea, et al., IEEE. Trans., Vol. c-21, pages 179–186, February 1972.

With the first method for adjusting positions of radiation images in accordance with the present invention, the locations of the template regions, at which the template regions best match to the reference regions, are found with the first template matching. Thereafter, the first affine transformation represented by the aforesaid formula is carried out, and at least the correction with the rotating operation and the correction with the enlargement or reduction factor are carried out on the radiation image containing the template regions. Specifically, the first affine transformation is carried out by using the factors a, b, c, and d representing the correction with the rotating operation and the correction with the enlargement or reduction factor.

Thereafter, the second template matching is carried out on the plurality of the radiation images, which have been obtained from the first affine transformation. The second template matching is thus carried out on the radiation images, which have been obtained from the correction with the rotating operation and the correction with the enlargement or reduction factor. Therefore, more accurate matching can be carried out than the first template matching.

The second affine transformation is then carried out in accordance with the corresponding points, which have been obtained from the second template matching. With the second affine transformation, the correction with the rotating operation, the correction with the enlargement or reduction factor, and the correction with the parallel translation are carried out on the radiation image containing the template regions. Specifically, the second affine transformation is carried out by using the factors a, b, c, and d, which represent the correction with the rotating operation and the correction with the enlargement or reduction factor, and the factors e and f, which represent the correction with the parallel translation.

With the first method for adjusting positions of radiation images in accordance with the present invention, instead of an image pattern of a marker, or the like, being recorded for position adjustment together with an object image in each of radiation images, the specific regions are set in a radiation image. At least two affine transformations are then carried out in order to rotate and enlarge or reduce the specific regions. Therefore, the image information of the object can be obtained also from the portion of the radiation image stored on the stimulable phosphor sheet, which portion will overlap upon the position of the pattern of the marker if the conventional technique is employed. Also, the accuracy and the speed, with which the positions of the radiation images are adjusted, can be kept high.

The present invention also provides a second method for adjusting positions of radiation images, wherein the positions of a plurality of radiation images are matched to one another such that the radiation images may be subjected to superposition processing or subtraction processing, the method comprising the steps of:

i) setting at least two closed regions in each of the plurality of the radiation images, the positions of which are to be adjusted, such that the closed regions may have approximately identical shapes among the plurality of the radiation images, ii) calculating a position, at which the center of gravity on each of the closed regions is located, and iii) carrying out a rotating operation, enlargement or reduction, and parallel translation of each of radiation images other than a radiation image, which serves as a reference among the plurality of the radiation images, such that each of coordinates of the position, at which the center of gravity on each of the closed regions is located, in each of the other radiation images may coincide with each of coordinates of the position, at which the center of gravity on each of the closed regions is located, in the radiation image serving as the reference.

The term "closed region" as used herein means a region, which is found as being closed by processing the image signal components of the image signal representing the radiation image with a certain threshold value. For example, in cases where the radiation image is of the chest of a human body, the image patterns of the lung fields can be taken as the closed regions. Even if the plurality of the radiation images are inclined with respect to one another, the corresponding closed regions in the radiation images can be regarded as having substantially the same shapes. Therefore, the corresponding closed regions in the radiation images can be utilized as the index for the position adjustment. The closed regions can be set by binarizing the image signal with a certain threshold value.

As described above, the shapes of the corresponding closed regions in the plurality of the radiation images are substantially identical among the radiation images. The image information (image signal values) will vary slightly among the corresponding closed regions in the radiation images, depending on the conditions under which the radiation images were recorded. However, the relationship between the position, at which the center of gravity on each of the corresponding closed regions is located, and the position of each of the corresponding closed regions is substantially identical among the corresponding closed regions. Therefore, two points can be set in each of the radiation image, which points are common among the radiation images, and the positions of the radiation images can thereby be adjusted to one another.

As one of the techniques for calculating the position, at which the center of gravity on each of the closed regions is located, the method for determining an image point in an object image, which is disclosed in U.S. Pat. No. 5,179,597, may be employed. With the disclosed method, an image signal comprising image signal components representing image information at respective picture elements on a recording medium, on which a radiation image including an object image has been recorded, is obtained. Based on the image signal, the respective picture elements are weighted with image signal values corresponding to the respective picture elements or with the reciprocals of the image signal values, and the center of gravity on the recording medium is thereby found. In the second method for adjusting positions of radiation images in accordance with the present invention (and in a third method for adjusting positions of radiation images in accordance with the present invention, which will be described later), instead of the image signal representing the entire radiation image being used, the position, at which the center of gravity on each closed region is located, may be calculated from only the image signal components of the image signal, which correspond to the closed region having been found from the processing with a certain threshold value. In the second method for adjusting positions of radiation images in accordance with the present invention (and in the third method for adjusting positions of radiation images in accordance with the present invention), any of other techniques may be employed in order to calculate the position, at which the center of gravity on each closed region is located.

In the second method for adjusting positions of radiation images in accordance with the present invention, the rotating operation, the enlargement or reduction, and the parallel translation may be carried out simultaneously or one after another. For example, in cases where two closed regions are set in each of the radiation images, one of the radiation images other than the radiation image serving as the reference may be translated in parallel such that the position, at which the center of gravity on one of the closed regions is located, in the other radiation image may coincide with the position, at which the center of gravity on the corresponding closed region is located, in the radiation image serving as the reference. Thereafter, the other radiation image may be rotated and enlarged or reduced such that the position, at which the center of gravity on the other closed region is located, in the other radiation image may coincide with the position, at which the center of gravity on the other closed region is located, in the radiation image serving as the reference. Alternatively, a line connecting the two positions, at which the centers of gravity on the two closed regions are located, may be set in each radiation image. The radiation image other than the radiation image serving as the reference may then be rotated such that the inclination of the line on the other radiation image may become equal to the inclination of the line on the radiation image serving as the reference. Thereafter, the other radiation image may be translated in parallel and enlarged or reduced such that the two positions, at which the centers of gravity on the two closed regions are located, in the other radiation image may coincide with the two positions, at which the centers of gravity on the two closed regions are located, in the radiation image serving as the reference.

The present invention further provides a third method for adjusting positions of radiation images, wherein the positions of a plurality of radiation images are matched to one another such that the radiation images may be subjected to superposition processing or subtraction processing, the method comprising the steps of:

i) setting at least two closed regions in each of the plurality of the radiation images, the positions of which are to be adjusted, such that the closed regions may have approximately identical shapes among the plurality of the radiation images, ii) defining an orthogonal coordinate system on each of the plurality of the radiation images, iii) calculating a position, at which the center of gravity on each of the closed regions is located, iv) calculating factors of affine transformation for transforming values of coordinates in each of radiation images other than a radiation image, which serves as a reference among the plurality of the radiation images, into values of coordinates in the radiation image, which serves as the reference, such that each of coordinates of the position, at which the center of gravity on each of the closed regions is located, in each of the other radiation images may coincide with each of coordinates of the position, at which the center of gravity on each of the closed regions is located, in the radiation image serving as the reference, the affine transformation being represented by the formula $$\begin{pmatrix} u \\ v \end{pmatrix} = \begin{pmatrix} a & b \\ c & d \end{pmatrix} \cdot \begin{pmatrix} x \\ y \end{pmatrix} + \begin{pmatrix} e \\ f \end{pmatrix}$$

wherein u and v represent the coordinates of the reference closed region, x and y represents the coordinates of the general closed region, a, b, c, and d are the factors representing correction with a rotating operation and correction with an enlargement or reduction factor, and e and f are the factors representing correction with parallel translation, v) carrying out first affine transformation, in which the calculated factors of affine transformation are used and with which at least the correction with the rotating operation and the correction with the enlargement or reduction factor are carried out on the other radiation images, vi) setting at least two regions of interest in each of the plurality of the radiation images, which have been obtained from the first affine transformation, such that the regions of interest may be approximately common to the plurality of the radiation images, the regions of interest in a radiation image, which serves as a reference among the plurality of the radiation images, being taken as reference regions, the regions of interest in the radiation images other than the radiation image, which serves as the reference, being taken as template regions, vii) carrying out template matching in order to match the template regions to corresponding reference regions, viii) calculating values of coordinates of corresponding points in the plurality of the radiation images, which have been subjected to the template matching, at least two corresponding points being taken in each of the plurality of the radiation images, ix) calculating the factors of affine transformation, which is represented by the formula, such that the corresponding points in the plurality of the radiation images may coincide with one another, and x) carrying out second affine transformation, in which the factors of affine transformation having been calculated after the template matching are used and with which the correction with the rotating operation, the correction with the enlargement or reduction factor, and the correction with the parallel translation are carried out on the plurality of the radiation images containing the template regions.

With the third method for adjusting positions of radiation images in accordance with the present invention, the first affine transformation represented by the aforesaid formula is carried out in order to transform the values of coordinates in each of the radiation images other than the radiation image, which serves as a reference among the plurality of the radiation images, into the values of coordinates in the radiation image, which serves as the reference, such that each of coordinates of the position, at which the center of gravity on each of the closed regions is located, in each of the other radiation images may coincide with each of coordinates of the position, at which the center of gravity on each of the closed regions is located, in the radiation image serving as the reference. With the first affine transformation, at least the correction with the rotating operation and the correction with the enlargement or reduction factor are carried out on each of the other radiation images. Specifically, the first affine transformation is carried out by using the factors a, b, c, and d representing the correction with the rotating operation and the correction with the enlargement or reduction factor.

Thereafter, the template matching is carried out on the plurality of the radiation images, which have been obtained from the first affine transformation. The template matching is thus carried out on the radiation images, which have been obtained from the correction with the rotating operation and the correction with the enlargement or reduction factor. Therefore, the template matching can be carried out accurately.

The second affine transformation is then carried out in accordance with the corresponding points, which have been obtained from the template matching. With the second affine transformation, the correction with the rotating operation, the correction with the enlargement or reduction factor, and the correction with the parallel translation are carried out on the radiation image containing the template regions. Specifically, the second affine transformation is carried out by using the factors a, b, c, and d, which represent the correction with the rotating operation and the correction with the enlargement or reduction factor, and the factors e and f, which represent the correction with the parallel translation.

With the second method for adjusting positions of radiation images in accordance with the present invention, instead of an image pattern of a marker, or the like, being recorded for position adjustment together with an object image in each of radiation images, at least two closed regions are set in each of the radiation images. The position, at which the center of gravity on each of the closed regions is located, is then calculated. Thereafter, each of the radiation images other than the radiation image, which serves as the reference among the plurality of the radiation images, is rotated, enlarged or reduced, and translated in parallel in accordance with the position, at which the center of gravity on each of the closed regions is located. Therefore, the image information of the object can be obtained also from the portion of the radiation image stored on the stimulable phosphor sheet, which portion will overlap upon the position of the pattern of the marker if the conventional technique is employed.

Also, with the third method for adjusting positions of radiation images in accordance with the present invention, the position, at which the center of gravity on each of the closed regions is located, is calculated. Each of the radiation images other than the radiation image, which serves as the reference among the plurality of the radiation images, is then rotated and enlarged or reduced in accordance with the position, at which the center of gravity on each of the closed regions is located. Thereafter, the template matching is carried out on the basis of at least two regions of interest, which are set in each of the radiation images. The correction with the rotating operation, the correction with the enlargement or reduction factor, and the correction with the parallel translation are then carried out. Therefore, the accuracy and the speed, with which the positions of the radiation images are adjusted, can be kept high.

BRIEF DESCRIPTION OF THE DRAWINGS

FIG. 7 is an explanatory view showing an example of how an X-ray image 14b is rotated, enlarged or reduced, and translated in parallel with reference to the positions, at which the centers of gravity on closed regions are located, such that the position of the X-ray image 14b may coincide with the position of an X-ray image 14a, and FIG. 8 is an explanatory view showing a different example of how the X-ray image 14b is rotated, enlarged or reduced, and translated in parallel with reference to the positions, at which the centers of gravity on closed regions are located, such that the position of the X-ray image 14b may coincide with the position of the X-ray image 14a.

DESCRIPTION OF THE PREFERRED EMBODIMENTS

The present invention will hereinbelow be described in further detail with reference to the accompanying drawings.

First, an embodiment of the first method for adjusting positions of radiation images in accordance with the present invention will be described hereinbelow.

Figure 1:
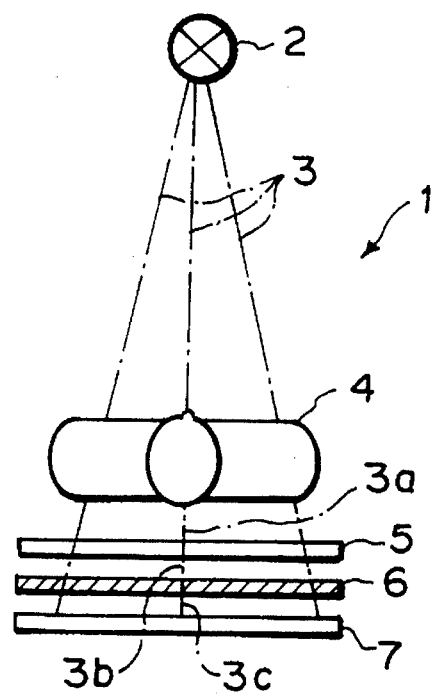
FIG. 1 is a schematic view showing an X-ray image recording apparatus, which is an example of an apparatus for recording radiation images.

FIG. 1 is a schematic view showing an X-ray image recording apparatus 1, which is an example of an apparatus for recording radiation images to be used in the present invention. In this embodiment, the X-ray images recorded by the X-ray image recording apparatus 1 are utilized during energy subtraction processing.

A first stimulable phosphor sheet 5 is placed upon a second stimulable phosphor sheet 7 with a filter 6 intervening therebetween. An object 4 lies above the first stimulable phosphor sheet 5, and an X-ray tube 2 for producing X-rays 3 is located above the object 4. The X-ray image recording apparatus 1 is constituted in this manner.

The X-rays 3, which have been produced by the X-ray tube 2, are irradiated to the object 4. X-rays 3a, which have passed through the object 4, impinge upon the first stimulable phosphor sheet 5, and part of energy from the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then pass through the filter 6. X-rays 3c, which have passed through the filter 6, impinge upon the second stimulable phosphor sheet 7. In this manner, an X-ray image of the object 4 is stored on the second stimulable phosphor sheet 7.

Figure 2:
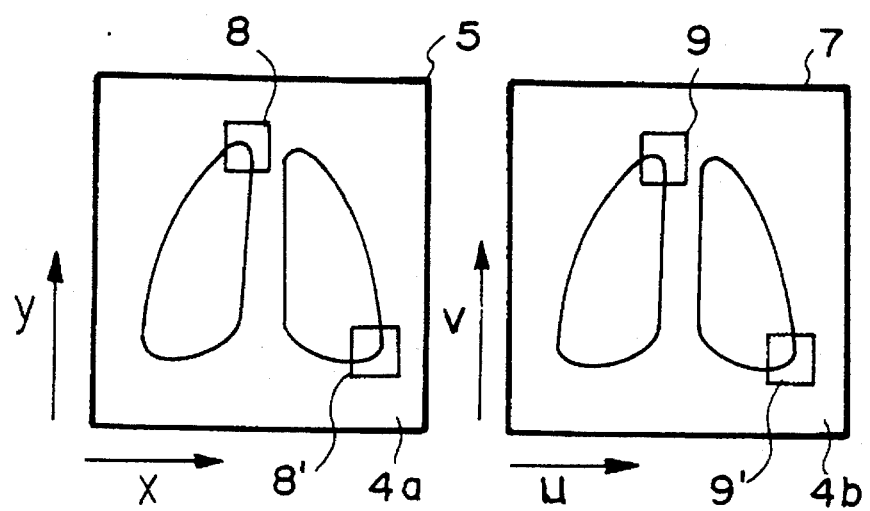
FIG. 2 is an explanatory view showing examples of X-ray images stored on stimulable phosphor sheets.

FIG. 2 is an explanatory view showing examples of the X-ray images stored on the stimulable phosphor sheets 5 and 7. As illustrated in FIG. 2, X-ray images 4a and 4b are respectively stored on approximately entire areas of the stimulable phosphor sheets 5 and 7.

Figure 3:
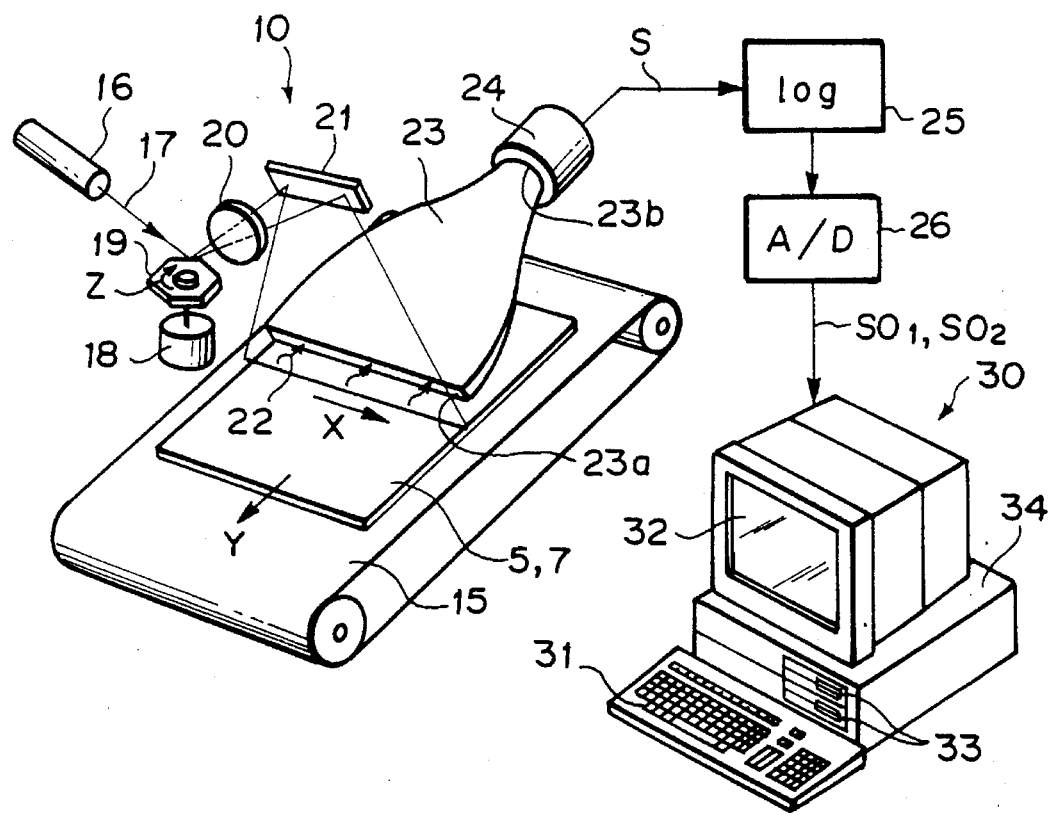
FIG. 3 is a perspective view showing an X-ray image read-out apparatus, which is an example of a readout unit for reading out a radiation image to be used in an embodiment of the method for adjusting positions of radiation images in accordance with the present invention, and an image processing and displaying apparatus, which is an example of an operation unit for carrying out the embodiment of the method in accordance with the present invention and carrying out subtraction processing.

FIG. 3 is a perspective view showing an X-ray image read-out apparatus 10, which is an example of a read-out unit for reading out a radiation image to be used in an embodiment of the method for adjusting positions of radiation images in accordance with the present invention, and an image processing and displaying apparatus 30, which is an example of an operation unit for carrying out the embodiment of the method in accordance with the present invention and carrying out subtraction processing.

After the first X-ray image and the second X-ray image have been stored respectively on the first stimulable phosphor sheet 5 and the second stimulable phosphor sheet 7 in the X-ray image recording apparatus 1 shown in FIG. 1, the first stimulable phosphor sheet 5 and the second stimulable phosphor sheet 7 are placed one after the other at a predetermined position in the X-ray image read-out apparatus 10 shown in FIG. 3. How the first X-ray image is read out from the first stimulable phosphor sheet 5 will be described hereinbelow.

With reference to FIG. 3, the first stimulable phosphor sheet 5 is conveyed in a sub-scanning direction indicated by the arrow Y by a sheet conveyance means 15, which is constituted of an endless belt, or the like, and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which may be constituted of an fθ lens, or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second X-ray image stored on the second stimulable phosphor sheet 7. The second image signal SO2 is stored in the internal memory of the image processing and displaying apparatus 30.

In the manner described above, the two image signals SO1 and SO2 to be subjected to the subtraction processing are stored in the internal memory of the image processing and displaying apparatus 30. Thereafter, the two image signals SO1 and SO2 are read from the internal memory and processed for the adjustment of the positions of the two X-ray images such that the image signal components of the two image signals SO1 and SO2, which represent corresponding picture elements in the X-ray images, may be subtracted from each other.

How the positions of the two X-ray images represented by the image signals SO1 and SO2 are adjusted in this embodiment will be described hereinbelow.

In the embodiment of the first method for adjusting positions of radiation images in accordance with the present invention, it is important that at least two characteristic regions of interest (i.e. portions having complicated structures, such as cross edges) are set in each of the X-ray images 4a and 4b shown in FIG. 2. In the X-ray image 4a, the regions of interest are set as template regions 8 and 8'. Also, in the X-ray image 4b, the regions of interest are set as reference regions 9 and 9'. In this embodiment, the positions of the template regions 8 and 8' are respectively matched to the positions of the reference regions 9 and 9'. Also, the coordinate system with x and y axes and the coordinate system with u and v axes are respectively set on the stimulable phosphor sheets 5 and 7 as common orthogonal coordinate systems. The x and u axes extend in the transverse direction parallel to the plane of the sheet of FIG. 1. The y and v axes extend along a line normal to the plane of the sheet of FIG. 1.

First template matching is carried out in the manner described above by using the correlation method or the SSDA method in order to match the template regions 8 and 8' respectively to the reference regions 9 and 9'. As described above, in cases where the correlation method is employed, the point associated with the maximum normalized value gives the coordinates of each of corresponding points (i.e. sampling points) described below. In cases where the SSDA method is employed, the point associated with the minimum residual gives the coordinates of each of the corresponding points.

The coordinates in the first X-ray image are transformed with affine transformation, which is represented by Formula (1)

$$\begin{pmatrix} X_2 \\ Y_2 \end{pmatrix} = \begin{pmatrix} a & b \\ c & d \end{pmatrix} \cdot \begin{pmatrix} X_1 \\ Y_1 \end{pmatrix} + \begin{pmatrix} e \\ f \end{pmatrix} \qquad (1)$$

wherein (X1, Y1) represents the coordinates of the sampling point in each of the template regions on the first X-ray image represented by the first image signal SO1, (X2, Y2) represents the coordinates of the sampling point in each of the reference regions on the second X-ray image represented by the second image signal SO2, and a, b, c, d, e, and f represent the factors. In this manner, the first X-ray image and the second X-ray image are superposed one upon the other. With the coordinate transformation, which is carried out in accordance with Formula (1), the enlargement or reduction of the entire area of the first X-ray image in each of the x and y directions, the rotating operation of the entire area of the first X-ray image, and parallel translation of the first X-ray image in the x and y directions are carried out simultaneously. However, in the embodiment of the first method for adjusting positions of radiation images in accordance with the present invention, the adjustment of the positions of the X-ray images are achieved by two or more affine transformations. Therefore, with the first affine transformation, only the rotating operation and the transformation of the enlargement or reduction factor are carried out. Specifically, even if the parallel translation is carried out with the first affine transformation, the rotating operation and the enlargement or reduction are thereafter carried out again. Therefore, the parallel translation, which is comparatively easy to carry out, may be carried out in the second or final affine transformation.

How the factors a, b, c, d, e, and f contained in Formula (1) are calculated will be described hereinbelow.

Formula (1) can be divided into $$X_2 = aX_1 + bY_1 + e \tag{2}$$

and $$Y_2 = cX_1 + dY_1 + f \tag{3}$$

The coordinates of marks $11a$, $12a$, and $13a$ on the first X-ray image are respectively expressed as (X11, Y11), (X12, Y12), and (X13, Y13). Also, the coordinates of marks $11a'$, $12a'$ and $13a'$ on the second X-ray image are respectively expressed as (X21, Y21), (X22, Y22), and (X23, Y23). In such cases, Formulas (2) and (3) yield the following formulas.

$$X_{21} = aX_{11} + bY_{11} + e \tag{2a}$$

$$X_{22} = aX_{12} + bY_{12} + e \tag{2b}$$

$$X_{23} = aX_{13} + bY_{13} + e \tag{2c}$$

$$Y_{21} = cX_{11} + dY_{11} + f \tag{3a}$$

$$Y_{22} = cX_{12} + dY_{12} + f \tag{3b}$$

$$Y_{23} = cX_{13} + dY_{13} + f \tag{3c}$$

In accordance with six Formulas (2a), (2b), (2c), (3a), (3b), and (3c), the six factors a, b, c, d, e, and f can be calculated with the formulas $$a = \frac{\{(X_{21} - X_{22})(Y_{11} - Y_{13}) - (X_{21} - X_{23})(Y_{11} - Y_{12})\}}{\{(X_{11} - X_{12})(Y_{11} - Y_{13}) - (X_{11} - X_{13})(Y_{11} - Y_{12})\}} \tag{4}$$

$$b = \frac{\{(X_{21} - X_{22})(X_{11} - X_{13}) - (X_{21} - X_{23})(X_{11} - X_{12})\}}{\{(Y_{11} - Y_{12})(X_{11} - X_{13}) - (Y_{11} - Y_{13})(X_{11} - X_{12})\}} \tag{5}$$

$$c = \frac{\{(Y_{21} - Y_{22})(Y_{11} - Y_{13}) - (Y_{21} - Y_{23})(Y_{11} - Y_{12})\}}{\{(X_{11} - X_{12})(Y_{11} - Y_{13}) - (X_{11} - X_{13})(Y_{11} - Y_{12})\}} \tag{6}$$

$$d = \frac{\{(Y_{21} - Y_{22})(X_{11} - X_{13}) - (Y_{21} - Y_{23})(X_{11} - X_{12})\}}{\{(Y_{11} - Y_{12})(X_{11} - X_{13}) - (Y_{11} - Y_{13})(X_{11} - X_{12})\}} \tag{7}$$

$$e = \{(X_{21} X_{12} - X_{11} X_{22})(Y_{12} X_{13} - Y_{13} X_{12}) - \tag{8}$$
$$(X_{22} X_{13} - X_{23} X_{12})(Y_{11} X_{12} - Y_{12} X_{11})\} /$$
$$\{(X_{12} - X_{11})(Y_{12} X_{13} - Y_{13} X_{12}) -$$
$$(X_{13} - X_{12})(Y_{11} X_{12} - Y_{12} X_{11})\}$$

$$f = \{(Y_{21} X_{12} - X_{11} Y_{22})(Y_{12} X_{13} - Y_{13} X_{12}) - \tag{9}$$
$$(Y_{22} X_{13} - Y_{23} X_{12})(Y_{11} X_{12} - Y_{12} X_{11})\} /$$
$$\{(X_{12} - X_{11})(Y_{12} X_{13} - Y_{13} X_{12}) -$$
$$(X_{13} - X_{12})(Y_{11} X_{12} - Y_{12} X_{11})\}$$

As described above, in the first affine transformation, only the rotating operation and the enlargement or reduction may be carried out. Therefore, for the first affine transformation, the factors e and f need not necessarily be carried out. However, the factors e and f are necessary for the final affine transformation, and therefore, how they are calculated is shown above.

In this manner, coordinate transformation is carried out with Formula (1) by using the factors a, b, c, and d, which have been calculated with Formulas (4), (5), (6), and (7). The inclination of the first X-ray image is thereby made approximately equal to the inclination of the second X-ray image.

In the embodiment of the first method for adjusting positions of radiation images in accordance with the present invention, in order to obtain a higher accuracy of position adjustment, one or more affine transformations are carried out after the first affine transformation. In the second affine transformation and those that follow, the second template matching is carried out on the template regions 8 and 8' in the first X-ray image, which has been obtained from the first affine transformation, and the factors of affine transformation shown in Formula (1) are calculated. In cases where only the second affine transformation is carried out after the first affine transformation, the six factors a, b, c, d, e, and f are calculated with Formulas (4), (5), (6), (7), (8), and (9) in the second affine transformation. In cases where the affine transformation is repeated even further, during the affine transformations before the final affine transformation, only the factors a, b, c, and d may be calculated with Formulas (4), (5), (6), and (7) as in the first affine transformation. In such cases, for the final affine transformation, the six factors a, b, c, d, e, and f may be calculated with Formulas (4), (5), (6), (7), (8), and (9).

In the aforesaid embodiment, with the first affine transformation, only the rotating operation and the transformation of the enlargement or reduction factor are carried out. Alternatively, with the first affine transformation, the parallel translation may be carried out simultaneously with the rotating operation and the transformation of the enlargement or reduction factor.

How the accuracy, with which the positions of the X-ray images are adjusted, can be enhanced by repeating the affine transformation several times will be described hereinbelow with reference to FIGS. 4 and 5.

Figure 4:
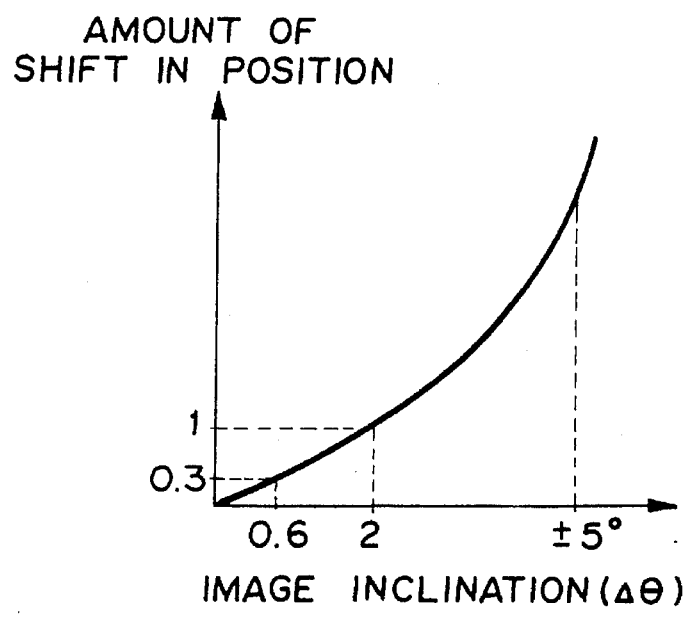
FIG. 4 is a graph showing the relationship between an inclination of a radiation image with respect to a different radiation image and an error, which occurs between the positions of corresponding points obtained in the radiation image from template matching and the positions of true corresponding points in the radiation image.

FIG. 4 is a graph showing the relationship between an inclination of a radiation image with respect to a different radiation image and an error, which occurs between the positions of corresponding points obtained in the radiation image from template matching and the positions of true corresponding points in the radiation image. The graph indicates that, when the inclination of the radiation image is smaller, the shift between the positions of corresponding points obtained in the radiation image from template matching and the positions of true corresponding points in the radiation image can be made smaller. Also, the graph indicates that, in cases where the angle of inclination of the radiation image with respect to the different radiation image is equal to, for example, 2°, the amount of error between the positions of corresponding points obtained in the radiation image from template matching and the positions of true corresponding points in the radiation image is approximately equal to the distance corresponding to a single picture element. Actually, the deviation in position between radiation images occurs due to conditions in a cassette, the image recording apparatus, and the image read-out apparatus, and therefore the angle of image inclination falls within the range of ±3°. It has been confirmed that the relationship shown in FIG. 4 is effective over the image inclination range of approximately ±5°.

Figure 5A:
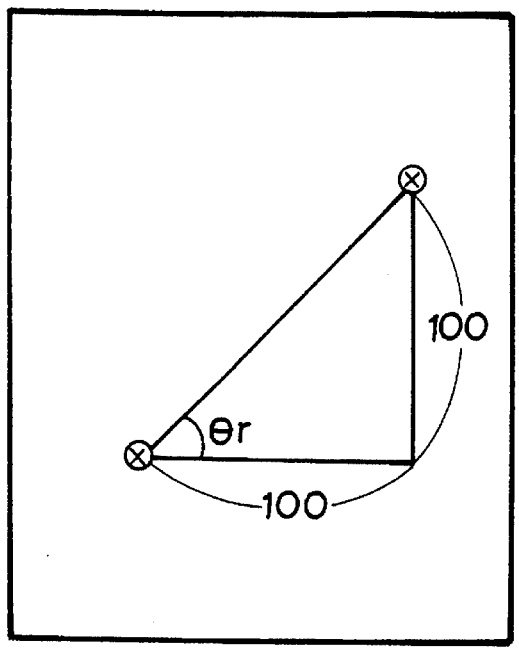
FIG. 5A is an explanatory view showing the positions of two true corresponding points in a radiation image, the two corresponding points being spaced a distance equal to the total length of 100 picture elements from each other in each of x and y directions.
Figure 5B:
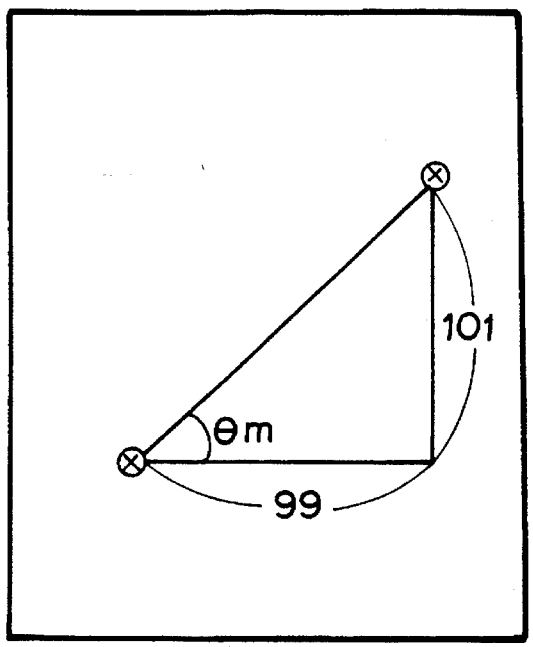
FIG. 5B is an explanatory view showing the positions of two corresponding points in the radiation image, which are obtained from template matching when the true corresponding points are located at the positions shown in FIG. 5A.

FIG. 5A is an explanatory view showing the positions of two true corresponding points in a radiation image, the two corresponding points being spaced a distance equal to the total length of 100 picture elements from each other in each of x and y directions. FIG. 5B is an explanatory view showing the positions of two corresponding points in the radiation image, which are obtained from template matching when the true corresponding points are located at the positions shown in FIG. 5A. FIG. 5B indicates that, in cases where the angle of inclination of the radiation image with respect to the different radiation image is equal to 2°, the positions of the two corresponding points in the radiation image, which are obtained from template matching, shift a distance equal to the length of a single picture element from the positions of the true corresponding points.

In FIG. 5A, the angle of inclination of the straight line, which connects the true corresponding points, is calculated with the formula $\theta r = tan^{-1}(100/100) = 45°$ In FIG. 5B, even in the worst case, the angle of inclination of the straight line, which connects the corresponding points presumed from the template matching, is expressed as $\theta m = tan^{-1}(101/99) = 45.6°$ Therefore, the amount of deviation between the inclination of the straight line, which connects the corresponding points presumed from the template matching, and the inclination of the straight line, which connects the true corresponding points, is at most 0.6°. Specifically, the original angle of inclination of the radiation image with respect to the different radiation image, which angle was 2°, is improved by the single affine transformation to 0.6°. As illustrated in FIG. 4, when the second template matching and the second affine transformation are thereafter carried out with the embodiment of the method for adjusting positions of radiation images in accordance with the present invention, the amount of shift in position between the corresponding points can be restricted to a distance corresponding to the length of 0.3 picture element or less. At this time, even in the worst case, the angle of inclination of the straight line, which connects the corresponding points presumed from the template matching, is expressed as $\theta m' = tan^{-1}(100.3/99.7) = 45.2°$ Therefore, the amount of deviation between the inclination of the straight line, which connects the corresponding points presumed from the template matching, and the inclination of the straight line, which connects the true corresponding points, is at most 0.2°. Specifically, the original angle of inclination of the radiation image with respect to the different radiation image, which angle was 2°, is improved by the two affine transformations to 0.2°. Therefore, when the affine transformation is repeated several times, the amount of rotation between the plurality of radiation images can be decreased little by little, and the accuracy, with which the positions of the radiation images are adjusted, can be kept higher.

In the example of FIG. 5A, the two true corresponding points in the radiation image are spaced a distance equal to the total length of 100 picture elements from each other in each of x and y directions. However, the method for adjusting positions of radiation images in accordance with the present invention is not limited to such cases. A different example will be described hereinbelow wherein two true corresponding points in a radiation image are spaced a distance equal to the total length of 1,000 picture elements from each other in each of x and y directions, and the angle of inclination of the radiation image with respect to a different radiation image is equal to 2°. As in the aforesaid example, the angle of inclination of the straight line, which connects the true corresponding points, is equal to 45°. Also, even in the worst case, the angle of inclination of the straight line, which connects the corresponding points presumed from the template matching, is expressed as $\theta m = tan^{-1}(1001/999) = 45.06°$ Therefore, the amount of deviation between the inclination of the straight line, which connects the corresponding points presumed from the template matching, and the inclination of the straight line, which connects the true corresponding points, is at most 0.06°. Specifically, the original angle of inclination of the radiation image with respect to the different radiation image, which angle was 2°, is improved by the single affine transformation to 0.06°. Accordingly, as the distance between the corresponding points is longer, the accuracy, with which the positions of the radiation images are adjusted, can be kept higher.

Embodiments of the second and third methods for adjusting positions of radiation images in accordance with the present invention will be described hereinbelow.

Figure 6:
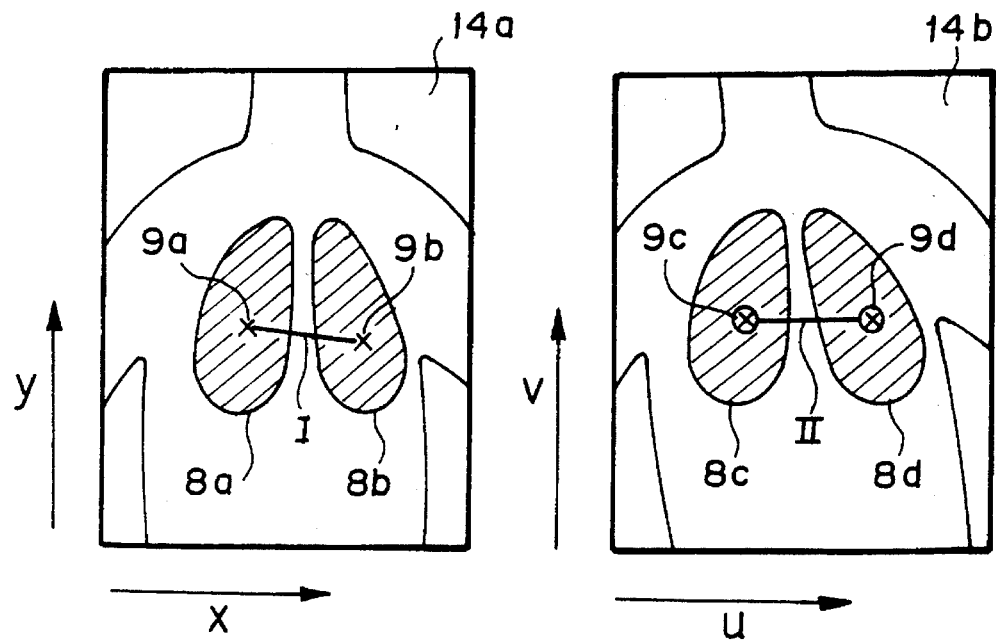
FIG. 6 is an explanatory view showing different examples of X-ray images stored on stimulable phosphor sheets.

FIG. 6 is an explanatory view showing different examples of X-ray images, which have been stored on the stimulable phosphor sheets 5 and 7 by the X-ray image recording apparatus 1 of FIG. 1 in the same manner as that described above. As illustrated in FIG. 6, X-ray images 14a and 14b are respectively stored on approximately entire areas of the stimulable phosphor sheets 5 and 7.

After the first X-ray image and the second X-ray image have been stored respectively on the first stimulable phosphor sheet 5 and the second stimulable phosphor sheet 7 in the X-ray image recording apparatus 1 shown in FIG. 1, the first stimulable phosphor sheet 5 and the second stimulable phosphor sheet 7 are placed one after the other at the predetermined position in the X-ray image read-out apparatus 10 shown in FIG. 3. The first X-ray image stored on the first stimulable phosphor sheet 5 and the second X-ray image stored on the second stimulable phosphor sheet 7 are read out in the same manner as that described above.

In this manner, a first image signal SO1, which represents the first X-ray image stored on the first stimulable phosphor sheet 5, the a second image signal SO2, which represents the second X-ray image stored on the second stimulable phosphor sheet 7, are obtained. The image signals SO1 and SO2 are stored in the internal memory of the image processing and displaying apparatus 30 shown in FIG. 3.

In the manner described above, the two image signals SO1 and SO2 to be subjected to the subtraction processing are stored in the internal memory of the image processing and displaying apparatus 30. Thereafter, the two image signals SO1 and SO2 are read from the internal memory and processed for the adjustment of the positions of the two X-ray images such that the image signal components of the two image signals SO1 and SO2, which represent corresponding picture elements in the X-ray images, may be subtracted from each other.

How the positions of the two X-ray images represented by the image signals SO1 and SO2 are adjusted in the embodiment of the second method for adjusting positions of radiation images in accordance with the present invention will be described hereinbelow.

In this embodiment, each image signal is binarized by using a certain threshold value, and at least two closed regions are set in each X-ray image. The two closed regions, which have been set in this manner, is shown in FIG. 6. In FIG. 6, the hatched image patterns of lung fields are employed as the closed regions. Specifically, closed regions 8a and 8b are set in the X-ray image 14a, and closed regions 8c and 8d are set in the X-ray image 14b. Also, centers of gravity 9a, 9b, 9c, and 9d are shown on the closed regions 8a, 8b, 8c, and 8d. The positions, at which the centers of gravity on the closed regions 8a, 8b, 8c, and 8d are located, have been calculated with the method described in U.S. Pat. No. 5,179,597. Alternatively, any of other methods for calculating the positions, at which the centers of gravity are located, may be employed in the second method (and the third method) for adjusting positions of radiation images in accordance with the present invention.

Figure 7:
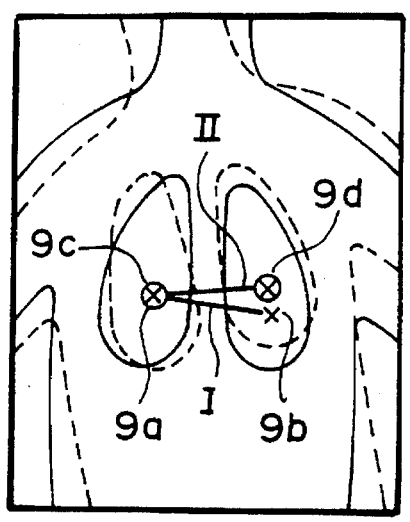
Figure 8:
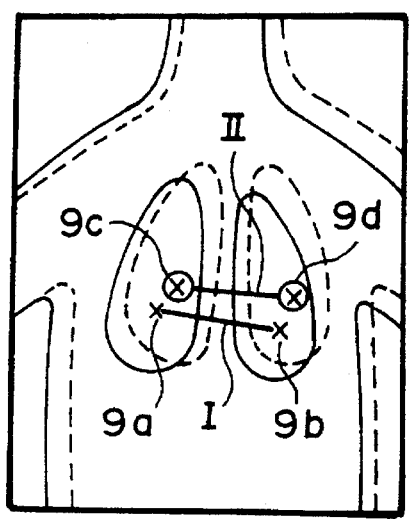

FIGS. 7 and 8 are explanatory views showing examples of how the X-ray image 14b is rotated, enlarged or reduced, and translated in parallel with reference to the positions, at which the centers of gravity on closed regions are located, such that the position of the X-ray image 14b may coincide with the position of the X-ray image 14a. In FIGS. 7 and 8, the X-ray image 14a is indicated by the solid line, and the X-ray image 14b is indicated by the broken line.

In the example of FIG. 7, the X-ray image 14b is translated in parallel such that the center of gravity 9c on the closed region 8c in the X-ray image 14b may coincide with the center of gravity 9a on the closed region 8a in the X-ray image 14a. Thereafter, the X-ray image 14b is rotated around the center of gravity 9c and enlarged or reduced such that the center of gravity 9d on the closed region 8d in the X-ray image 14b may coincide with the center of gravity 9b on the closed region 8b in the X-ray image 14a. In this manner, the positions of the two X-ray images 14a and 14b can be adjusted such that they may coincide with each other. At this time, the X-ray image 14b is rotated by the angle, which is made between a line I connecting the centers of gravity 9a and 9b and a line II connecting the centers of gravity 9c and 9d.

In the example of FIG. 8, the X-ray image 14b is rotated such that the line I and the line II may become parallel to each other. At this time, the X-ray image 14b may be rotated around any point, such as the center of gravity 9c, the center of gravity 9d, or a point lying on the line II. Thereafter, the X-ray image 14b is translated in parallel and enlarged or reduced such that the positions, at which the corresponding centers of gravity are located in the two X-ray images 14a and 14b, may coincide with each other. In this manner, the positions of the two X-ray images 14a and 14b can be adjusted such that they may coincide with each other.

How the positions of the two X-ray images represented by the image signals SO1 and SO2 are adjusted in an embodiment of the third method for adjusting positions of radiation images in accordance with the present invention will be described hereinbelow.

In this embodiment, as illustrated in FIG. 6, the positions, at which the centers of gravity on all of the closed regions are located, are calculated in the same manner as that in the embodiment of the second method for adjusting positions of radiation images in accordance with the present invention. Also, the coordinate system with the x and y axes and the coordinate system with the u and v axes are respectively set on the stimulable phosphor sheets 5 and 7 as common orthogonal coordinate systems. The x and u axes extend in the transverse direction parallel to the plane of the sheet of FIG. 1. The y and v axes extend along a line normal to the plane of the sheet of FIG. 1. The closed regions 8a and 8b in the X-ray image 14a are referred to as the template regions. The closed regions 8c and 8d in the X-ray image 14b are referred to as the reference regions. Thereafter, the X-ray image 14a is rotated, enlarged or reduced, and translated in parallel with reference to the coordinates of the centers of gravity on the closed regions such that the coordinates in the template regions 8a and 8b may coincide with the coordinates in the reference regions 8c and 8d. In this embodiment, the position of the X-ray image 14a is adjusted such that it may match with the position of the X-ray image 14b.

The coordinates in the first X-ray image 14a are transformed with affine transformation, which is represented by Formula (1) shown above, wherein (X1, Y1) represents the coordinates of each of sampling points, which lie on at least two centers of gravity and the line connecting the centers of gravity in the first X-ray image represented by the first image signal SO1, (X2, Y2) represents the coordinates of each of the sampling points corresponding to (X1, Y1), which sampling points lie on at least two centers of gravity and the line connecting the centers of gravity in the second X-ray image represented by the second image signal SO2, and a, b, c, d, e, and f represent the factors. In this manner, the first X-ray image 14a and the second X-ray image 14b are superposed one upon the other. With the coordinate transformation which is carried out with Formula (1), the enlargement or reduction of the entire area of the first X-ray image 14a in each of the x and y directions, the rotating operation of the entire area of the first X-ray image 14a, and parallel translation of the first X-ray image 14a in the x and y directions are carried out simultaneously. However, in the embodiment of the third method for adjusting positions of radiation images in accordance with the present invention, the adjustment of the positions of the X-ray images are achieved by two or more affine transformations. Therefore, with the first affine transformation, only the rotating operation and the transformation of the enlargement or reduction factor are carried out.

How the factors a, b, c, d, e, and f contained in Formula (1) are calculated in this embodiment will be described hereinbelow.

Formula (1) can be divided into Formulas (2) and (3) shown above. The coordinates of the center of gravity 9a, the center of gravity 9b, and a single point lying on the line I in the first X-ray image 14a are respectively expressed as (X11, Y11), (X12, Y12), and (X13, Y13). Also, the coordinates of the center of gravity 9c, the center of gravity 9d, and a single point, which lies on the line II, in the second X-ray image 14b are respectively expressed as (X21, Y21), (X22, Y22), and (X23, Y23). In such cases, Formulas (2) and (3) yield Formulas (2a), (2b), (2c), (3a), (3b), and (3c) shown above. In accordance with six Formulas (2a), (2b), (2c), (3a), (3b), and (3c), the six factors a, b, c, d, e, and f can be calculated with Formulas (4), (5), (6), (7), (8), and (9).

As described above, in the first affine transformation, only the rotating operation and the enlargement or reduction may be carried out. Therefore, for the first affine transformation, the factors e and f need not necessarily be carried out. However, the factors e and f are necessary for the final affine transformation, and therefore how they are calculated are shown above.

In this manner, coordinate transformation is carried out with Formula (1) by using the factors a, b, c, and d, which have been calculated with Formulas (4), (5), (6), and (7). The inclination of the first X-ray image 14a is thereby made approximately equal to the inclination of the second X-ray image 14b.

In the embodiment of the third method for adjusting positions of radiation images in accordance with the present invention, in order to obtain a higher accuracy of position adjustment, a second affine transformation is carried out after the first affine transformation. In the second affine transformation, template matching is carried out such that the template regions in the first X-ray image, which has been obtained from the first affine transformation, may coincide with the reference regions in the second X-ray image.

The template matching is carried out in the manner described above by using the correlation method or the SSDA method in order to match the template regions respectively to the reference regions. As described above, in cases where the correlation method is employed, the point associated with the maximum normalized value gives the coordinates of each of the sampling points (i.e. the corresponding points) described above. In cases where the SSDA method is employed, the point associated with the minimum residual gives the coordinates of each of the sampling points. The second affine transformation is carried out by using the coordinates of the sampling points, which have been obtained from the template matching. Specifically, the factors of affine transformation shown in Formula (1) are calculated. The six factors a, b, c, d, e, and f may be calculated by substituting the coordinates of the sampling points into Formulas (4), (5), (6), (7), (8), and (9).

As described above with reference to FIGS. 4 and 5, the accuracy, with which the positions of the X-ray images are adjusted, can be enhanced by repeating the affine transformation several times.

What is claimed is:

1. A method for adjusting positions of radiation images, wherein the positions of a plurality of radiation images are matched to one another such that the radiation images may be subjected to superposition processing or subtraction processing, the method comprising the steps of:

i) setting at least two regions of interest in each of the radiation images, such that each region of interest in each radiation image is approximately common to a region of interest in each of the other radiation images, the regions of interest in a radiation image which serves as a reference among the radiation images being taken as reference regions, the regions of interest in the other radiation images being taken as template regions, ii) defining an orthogonal coordinate system on each of the radiation images, iii) carrying out a first template matching in order to match the template regions to corresponding reference regions, iv) calculating values of coordinates of corresponding points in the plurality of the radiation images, at least two corresponding points being taken in each of the radiation images, v) calculating factors of a first affine transformation for transforming values of coordinates in the radiation images which contain the template regions, into values of coordinates in the radiation image which contains the reference regions, such that said corresponding points in the plurality of the radiation images may coincide with one another, said affine transformation being represented by the formula $$\begin{pmatrix} u \\ v \end{pmatrix} = \begin{pmatrix} a & b \\ c & d \end{pmatrix} \cdot \begin{pmatrix} x \\ y \end{pmatrix} + \begin{pmatrix} e \\ f \end{pmatrix}$$

wherein u and v represent the coordinates of the reference region, x and y represents the coordinates of the specific region, a, b, c, and d are the factors representing correction with a rotating operation and correction with an enlargement or reduction factor, and e and f are the factors representing correction with parallel translation, vi) carrying out said first affine transformation, in which the calculated factors of said first affine transformation are used and in which at least the correction with the rotating operation and the correction with the enlargement or reduction factor are carried out on the radiation images containing the template regions, vii) carrying out a second template matching on the radiation images which have been obtained from the first affine transformation, viii) calculating the factors of a second affine transformation, which is represented by said formula, and ix) carrying out said second affine transformation, in which the factors of said second affine transformation having been calculated after the second template matching are used, and in which the correction with the rotating operation, the correction with the enlargement or reduction factor, and the correction with the parallel translation are carried out on the radiation images containing the template regions.

2. A method as defined in claim 1 wherein the first affine transformation is repeated a plurality of times.

3. A method as defined in claim 1 wherein each of the radiation images, the positions of which are to be adjusted, has been stored on a stimulable phosphor sheet.

4. A method as defined in claim 1 wherein the first template matching and the second template matching are carried out with a correlation method.

5. A method as defined in claim 1 wherein the first template matching and the second template matching are carried out with sequential similarity detection algorithms.

6. A method for adjusting positions of radiation images, wherein the positions of a plurality of radiation images are matched to one another such that the radiation images may be subjected to superposition processing or subtraction processing, the method comprising the steps of:

i) setting at least two closed regions in each of the plurality of the radiation images, such that the closed regions have approximately identical shapes among the plurality of the radiation images, ii) identifying a center of gravity position for each of the closed regions, and iii) carrying out a rotating operation, enlargement or reduction, and parallel translation of each of the radiation images other than a radiation image which serves as a reference among the plurality of the radiation images, such that the coordinates of said center of gravity positions in each of said other radiation images may coincide with the corresponding coordinates of said center of gravity positions in the radiation image serving as the reference.

7. A method as defined in claim 6 wherein each of the radiation images, the positions of which are to be adjusted, has been stored on a stimulable phosphor sheet.

8. A method as defined in claim 6 wherein the center of gravity positions are each identified by obtaining an image signal comprising image signal components representing image information at respective picture elements located in each closed region, and weighting the respective picture elements with image signal values corresponding to the respective picture elements or with the reciprocals of the image signal values.

9. A method for adjusting positions of radiation images, wherein the positions of a plurality of radiation images are matched to one another such that the radiation images may be subjected to superposition processing or subtraction processing, the method comprising the steps of:

i) setting at least two closed regions in each of the plurality of the radiation images, such that the closed regions have approximately identical shapes among the radiation images, ii) defining an orthogonal coordinate system on each of the radiation images, iii) identifying a center of gravity position for each of the closed regions, iv) calculating factors of a first affine transformation for transforming values of coordinates in each of the radiation images other than a radiation image which serves as a reference among the radiation images, into values of coordinates in the radiation image which serves as the reference, such that the coordinates of the center of gravity positions in each of said other radiation images coincide with the corresponding coordinates of the center of gravity positions in the radiation image servicing as the reference, said first affine transformation being represented by the formula $$\begin{pmatrix} u \\ v \end{pmatrix} = \begin{pmatrix} a & b \\ c & d \end{pmatrix} \cdot \begin{pmatrix} x \\ y \end{pmatrix} + \begin{pmatrix} e \\ f \end{pmatrix}$$

wherein u and v represent the coordinates of the reference closed region, x and y represents the coordinates of the general closed region, a, b, c, and d are the factors representing correction with a rotating operation and correction with an enlargement or reduction factor, and e and f are the factors representing correction with parallel translation, v) carrying out said first affine transformation, in which the calculated factors of said first affine transformation are used and in which at least the correction with the rotating operation and the correction with the enlargement or reduction factor are carried out on said other radiation images, vi) setting at least two regions of interest in each of the plurality of the radiation images, which have been obtained from the first affine transformation, such that the regions of interest may be approximately common to the plurality of the radiation images, the regions of interest in a radiation image which serves as a reference among the radiation images being taken as reference regions, the regions of interest in the other radiation images being taken as template regions, vii) carrying out template matching in order to match the template regions to corresponding reference regions, viii) calculating values of coordinates of at least two corresponding points for each of the radiation images which have been subjected to the template matching, ix) calculating the factors of a second affine transformation, which is represented by said formula, such that said corresponding points in the radiation images may coincide with one another, and x) carrying out said second affine transformation, using factors calculated after the template matching to carry out the correction with the rotating operation, the correction with the enlargement or reduction factor, and the correction with the parallel translation on the plurality of the radiation images containing the template regions.

10. A method as defined in claim 9 wherein each of the radiation images, the positions of which are to be adjusted, has been stored on a stimulable phosphor sheet.

11. A method as defined in claim 9 wherein the template matching is carried out with a correlation method.

12. A method as defined in claim 9 wherein the template matching is carried out with sequential similarity detection algorithms.

13. A method as defined in claim 9 wherein each of the center of gravity positions are identified by obtaining an image signal comprising image signal components representing image information at respective picture elements located in each closed region, and weighting the respective picture elements with image signal values corresponding to the respective picture elements or with the reciprocals of the image signal values.

\* \* \* \* \*